Jan. 2, 1968

F. G. LAMB

3,361,173

APPARATUS AND PROCESS FOR PRODUCING
CRINKLE CUT VEGETABLES

Filed Nov. 15, 1965

INVENTOR
Frank G. Lamb

BY Thomas, Weisman & Russell

ATTORNEYS

FIG. 4.

INVENTOR
Frank G. Lamb

Jan. 2, 1968

F. G. LAMB 3,361,173

APPARATUS AND PROCESS FOR PRODUCING
CRINKLE CUT VEGETABLES

Filed Nov. 15, 1965

INVENTOR
Frank G. Lamb

BY Thomas, Weisman & Russell

ATTORNEYS

Jan. 2, 1968  F. G. LAMB  3,361,173
APPARATUS AND PROCESS FOR PRODUCING
CRINKLE CUT VEGETABLES
Filed Nov. 15, 1965  8 Sheets-Sheet 5

INVENTOR
Frank G. Lamb
BY
Thomas, Weisman & Russell
ATTORNEYS

Jan. 2, 1968

F. G. LAMB 3,361,173

APPARATUS AND PROCESS FOR PRODUCING
CRINKLE CUT VEGETABLES

Filed Nov. 15, 1965

INVENTOR
Frank G. Lamb

BY *Thomas, Weisman & Russell*

ATTORNEYS

FIG. 11.

INVENTOR
Frank G. Lamb
BY Thomas, Weisman & Russell
ATTORNEYS

Fig. 13

Fig. 14

United States Patent Office 3,361,173
Patented Jan. 2, 1968

3,361,173
APPARATUS AND PROCESS FOR PRODUCING CRINKLE CUT VEGETABLES
Frank G. Lamb, Lake Oswego, Oreg., assignor to Lamb-Weston, Inc., Portland, Oreg., a corporation of Oregon
Filed Nov. 15, 1965, Ser. No. 507,902
6 Claims. (Cl. 146—240)

ABSTRACT OF THE DISCLOSURE

An apparatus and method for production of a crinkle cut food product, wherein said product is first impelled by hydraulic fluid through a cutter means to remove the longitudinal exterior slabs therefrom and then fed through first and second cutting zones in sideways fashion to cut the product into a plurality of elongated segments having corrugated sides.

---

This invention is directed to an improved mechanism, and method of use thereof, involving the production of segmented vegetable products and is more particularly pointed to potato products which are of the so called "crinkle cut" type, i.e., so called frenched potatoes with a characteristic corrugated or "crinkled" surface upon each of the four elongated sides thereof.

High speed mechanism has been developed using what I prefer to characterize as the "water gun knife" concept for the production of the ordinary frenched or string potatoes, this development utilizing hydraulic pressure to force the product against a series of slabbing and/or segmenting knives. Such apparatus and the method of production involving the operation of such an assembly are referred to in the Lamb et al. patents numbered 3,109,468 and 3,116,772. It is to be recognized with regard to such patents, however, that because only one "straight through" cut is made whether for slabbing or center cut purposes, this type of apparatus, as successful as it is in producing the named type of product, cannot attain a corrugated product—simply because, at best, corrugation could be obtained by the use of such design only upon two sides of the ultimate elongated segment. And even here, such corrugations or "crinkled" sides would normally be obtained only along the length of the product whereas what is desired, on each side, is a cut at right angles to the length of the product. This was recognized in my copending application Ser. No. 258,822, filed Feb. 15, 1963, now Patent No. 3,217,768, of which this is a continuation-in-part. The instant application is also a continuation-in-part of my applications Ser. Nos. 339,967 and 389,665, in the name of Frank G. Lamb, and filed Jan. 24, 1964, and Aug. 14, 1964, respectively, now Patents Nos. 3,273,617 and 3,327,751, respectively.

The instant design comprises an improvement over these parent disclosures in that the apparatus utilized is far simpler from an operative standpoint in providing for the conjoint use of the water gun knife for initial slabbing purposes, and a two step method of obtaining four sided crinkle cuts. Both of these basic features, among others, lend greater flexibility and improved functionality to the fundamental principles expounded upon and described in my co-pending applications, as referred to in the foregoing.

The problems heretofore existing with respect to large volume production of segmented products are referred to in the cited patents and need not be reiterated here, it having been there recognized that the advances characterized in such patents represent novel deviations from the known circular type of cutting apparatus and, of course, the cumbersome time consuming and difficult hand operations to obtain the crinkle cut product, as previously accomplished.

As indicated, the instant invention is representative of a high speed but simplified two step operation in which, firstly, the water gun knife is employed simply for high speed slabbing purposes and that only, and secondly, the product is segmented by two cutting operations along the cross sectional length of the tuber in a sequential stage that is timed or coordinated with the output of the hydraulic slabbing mechanism.

Accordingly, it is a primary objective of the instant invention to provide a high speed, efficient operation for the preparation of a crinkle cut product wherein side slabbing of the four sides is first accomplished by hydraulic feed to the side slab cutter and wherein the continuous output of such cutter is fed directly into a two-phase system or assembly for removing the end slabs of the product and segmenting the center cuts such as to produce corrugations or crinkle cuts upon each of the four sides of the product. Among other advantages of this dual procedure, wherein the hydraulic means is utilized for slabbing purposes only, is the benefit arising from the fact that, because fewer blades are used in that cut, even higher speeds may be employed, it being recognized through experience that from approximately five to seven potatoes per second may be slabbed by means of the hydraulic system just referred to.

An additional object of the invention is to provide a simplified drive means for the latter type of cut, i.e., the crinkle center cut, this means utilizing a single rocker arm as the sole propulsion means for two pusher elements so disposed right angularly to one another that the first forces the tuber through a first crinkle cut blade set up in one direction and the second forces the tuber through a second set of crinkle cut blades in a direction normal or right angularly to the first. Both movements are necessarily coordinated, eliminating any possibility of jamming or malfunction; yet the combination of elements to achieve this purpose represents the essence of simplicity.

Another objective of the invention is the provision of apparatus of the described type wherein not only may the product conveyor to the center cut apparatus be inclined to the horizontal, in which case the single rocker arm provides the required power source for continuous feeding of the products to the first cutting means, but also permits of an alternate arrangement wherein the feed belt may be laterally or horizontally disposed with the crinkle cutter mechanism being angularly disposed in its entirety so that the force of gravity eliminates the necessity of any biased forced feed or other mechanism to accomplish this same result. Because of its even greater simplicity, the latter arrangement is to be preferred, although both arrangements are herein described.

A further object of my invention is the provision of means in advance of the crinkle cut mechanism to space, align, and feed the slabbing segments which have been side slabbed by means of the water gun knife through an end cutter mechanism which removes each of the remaining ends of the potato if such is over a predetermined length.

Other objectives and advantages of the invention will be understood from consideration of the following more detailed description thereof, made in connection with the several figures illustrating the involved improvement, wherein like numerals designate like parts, and wherein.

Figures 1, 12:
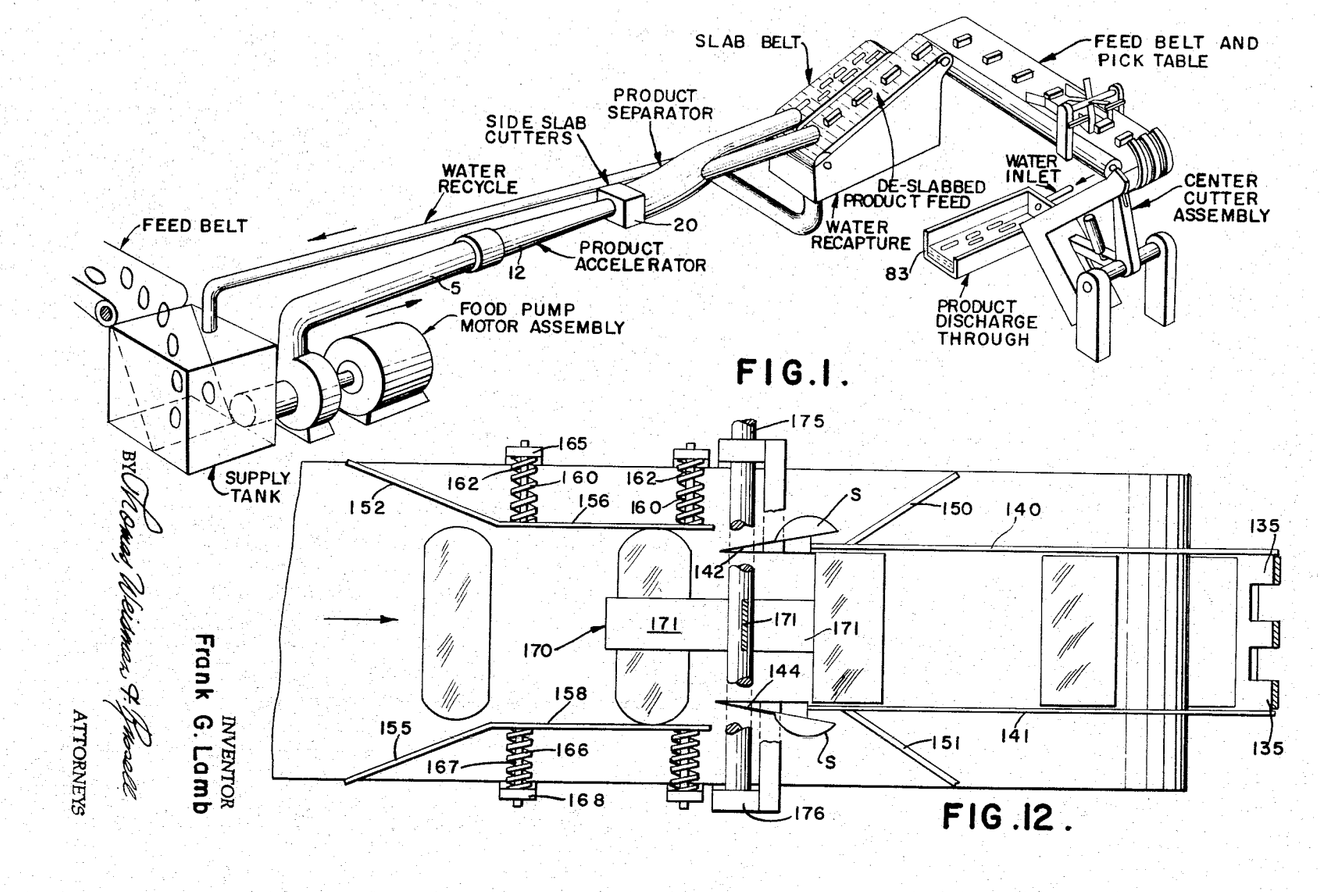
FIGURE 1 is a somewhat graphic representation, in perspective, of the entire sequence of the involved multiple operation from the time the raw product is fed into a supply tank to the time the completed and segmented product is discharged.
FIGURE 12 is a top plan view of the embodiment of the invention as shown in FIGURE 11, particularly illustrating the guide means for centering the slabbed product and the propulsion means for forcing the product (lengthwise) against two end cutters which remove the end slabs at this point in contradistinction to the embodiment of the invention heretofore described wherein these end slabs are removed during the first center cut stage (see FIGURES 6 and 7)

Referring more particularly to these several views, and first with reference to FIGURE 1, it is seen that the charge of potatoes via the usual feed belt is fed into a water filled supply tank, water and product being forced by means of a food pump through a line leading to a product accelerator which separates each product one from the other while at the same time longitudinally aligning the product in a fore and aft direction for impingement upon the side slabbing cutters.

Figures 2, 3:
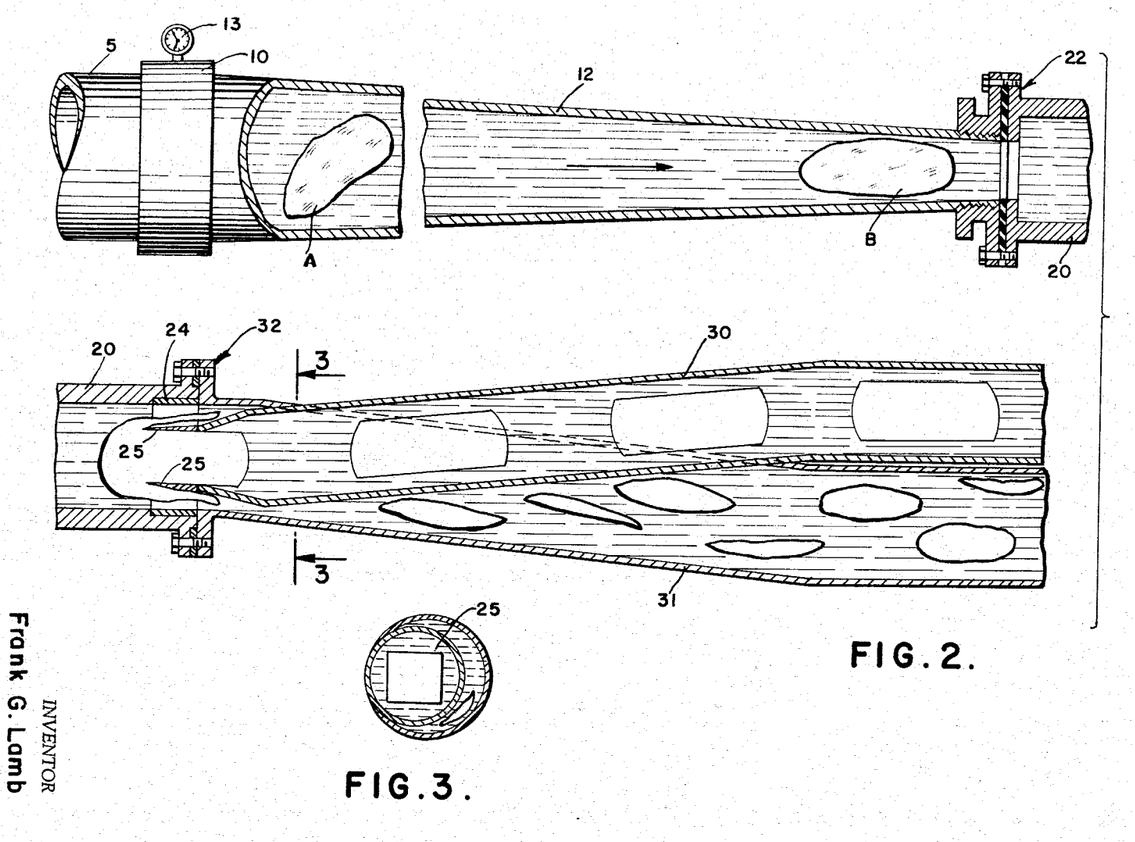
FIGURE 2 shows that section of the assembly (the two portions thereof being separated and broken away for illustrative purposes) having primarily to do with the hydraulic feeding and slabbing cutting operation, and also depicting, in partial cross section, the acceleration or separating zone as well as the means utilized to discharge separately the side slabbed product on the one hand and the slabs themselves on the other.

After removal of the side slabs the latter are separated from the slabbed product as shown in FIGURE 2, the slabs ultimately being discharged upon one conveyor belt for removal to other stages of processing, and the slabbed product being discharged to another sloping conveyor belt to be sequentially placed upon a belt at right angles thereto for feeding into the cutter mechanism to be described. The output of one water gun knife is capable of maintaining an adequate supply of slabbed product to several cutter mechanisms, but only one of the latter is shown in the drawing. Suitable conveyor arrangements to supply more than one cutter mechanism will be obvious to those skilled in the art from the description of the invention herein set forth.

Both the slab belt and the product belt are perforated and located over a water recapture chamber so that such water is preserved for recycling, as indicated, to the supply tank.

With reference to the de-slabbed product, it is seen that same is aligned for progress up the perforated belt after discharge from its respective separator flume so that when it reaches the adjacent pick table or feed belt for the cutter assembly, the product is disposed perpendicularly to the line of travel of the conveyor, or in proper position for feed into the cutter assembly. This latter feed belt is characterized as a "pick table" for here further manual alignment may be desired to assure proper feed into the crinkle cutter arrangement.

The system, as the one described in the aforesaid Patent No. 3,109,468, is a continuous one, operative, as indicated, at the highest rates of speed so that output of the frenched crinkle cut product from a single water gun knife and associated cutter mechanisms may be measured in the tens of thousands of pounds daily.

After completion of the two stage crinkle cut operation during which the end slabs are removed, if necessary (either immediately preceding the two cutting stages or during the same), the finished crinkle cut product is discharged into a product discharge trough or sluice where the segmented product is carried to another area of the plant for packaging, etc., a water inlet at the end of the trough being provided for this purpose. It should here be noted that this entire procedure contemplates keeping the product immersed in water during a large percentage of the time—an advantageous aspect in any potato processing plant.

As indicated, FIGURE 2 represents an enlarged view of the preliminary side slabbing procedure wherein the product is forced at high speed through line 5, the latter being connected by a suitable coupling 10 to a line 12 of gradually decreasing diameter. Here two functions are accomplished: The product is aligned from its off center position as it is shown at position A to one of axial alignment as it is shown in position B due to the narrowing constriction of this conduit; also, by such decreasing diameter the carrying medium is caused to accelerate the product and thus space it appreciably from a following product, both features preventing the impingement of more than one tuber upon the side slabbing cutters, and also eliminating any possibility of jamming at this stage.

If desired a pressure gauge 13 may be used for measurement of fluid pressure at this stage.

The accelerator, at its smaller and terminal end, is attached by means of any usual flange-gasket arrangement, as generally indicated at 22 to the cutter box 20, the latter containing the cutter frame 24 and four sets of cutters which are suitably mounted therein much as in the manner indicated in the aforesaid Patent No. 3,109,468. Here, however, only four cutters are used and these form a square or, depending upon the particular configuration of the involved type of tuber, a rectangular shape. These cutters are centered, as indicated at 25, to remove a slab from each of four sides of the potato. Such slabs are separated during the cutting process and, as indicated in FIGURE 2, to be discharged through line 31; whereas the slabbing product (except for the end slabs) is separately discharged through flume 30. Both of the flumes 30 and 31 are affixed to the cutter box by a suitable flange-gasket arrangement, generally indicated at 32. The latter carries the product, which still remains aligned, to an inclined product belt 35 where the series of potatoes are discharged in approximately the same alignment as indicated in FIGURE 1, and are again disposed upon the "pick table" conveyor in a direction right angularly to the direction of travel of this last named feed belt.

Insofar as the cutting operation be concerned, two embodiments of the invention are thus here involved. In the first the feed belt is inclined with the two stages of crinkle cut operation having a vertical plunger superimposed over a horizontal reciprocating plunger, this necessitating a spring biased, reciprocating pusher means or piston to continuously force the product underneath the first of these plungers. Also, in this version, end slabbing is accomplished by the first descent of the vertical plunger in conjunction with the initial center cut operation.

Figure 6:
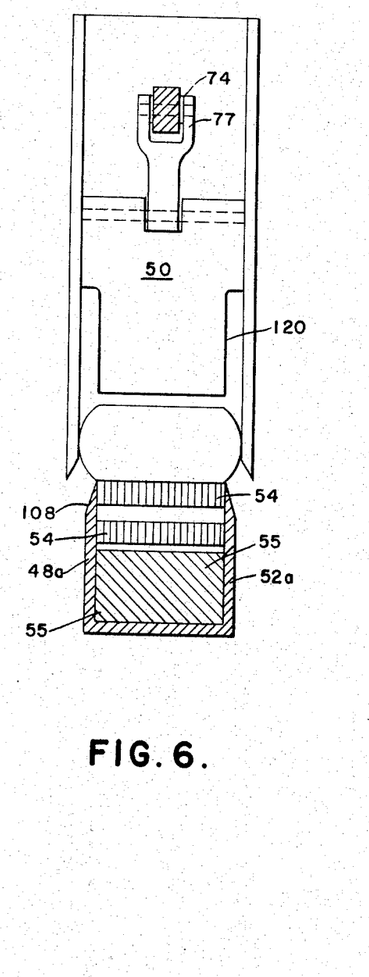
FIGURE 6 is a section view taken on the line 6—6 of FIGURE 4, with the rocker arm having retracted the vertical plunger to uppermost position.
Figure 7:
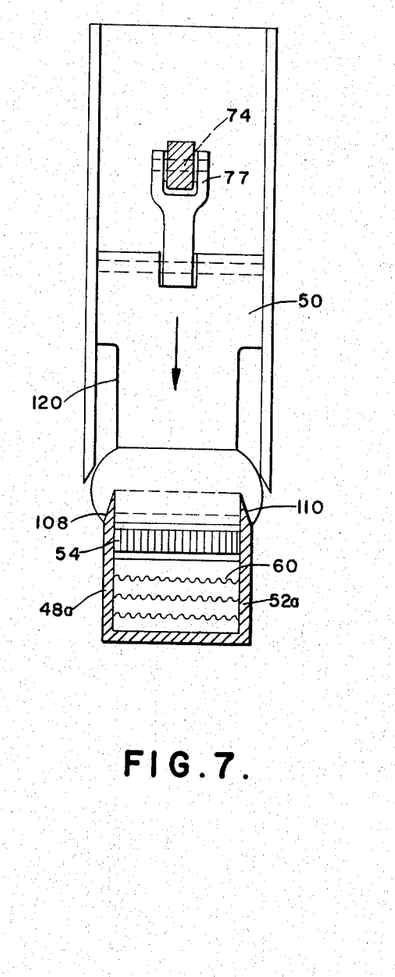
FIGURE 7 is a view similar to FIGURE 6, but disclosing the vertical plunger partially progressing through its stroke with the product just beginning to impinge upon the end slabbing cutters, this version of the invention removing the end slabs at this point rather than earlier, as in the alternate and preferred embodiment thereof shown, e.g., in FIGURE 11.
Figure 11:
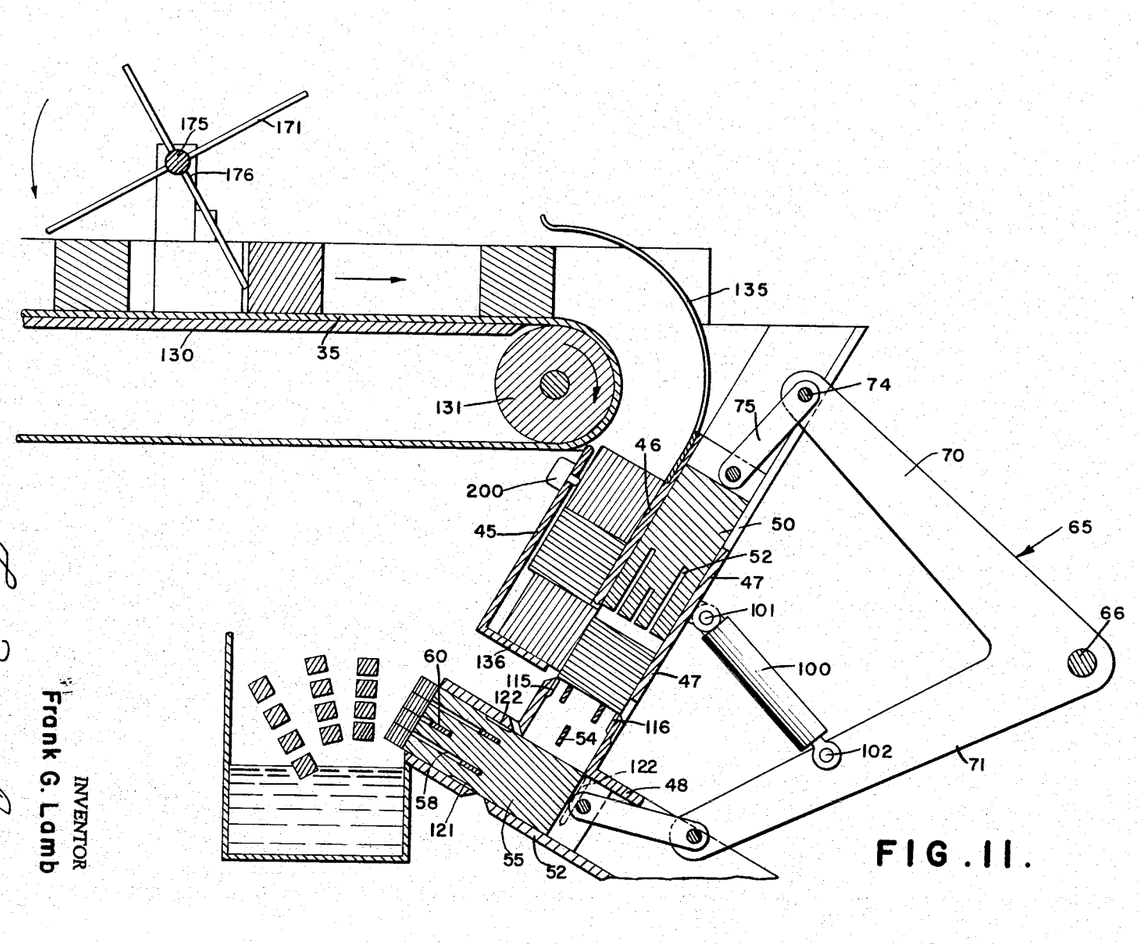
FIGURE 11 is illustrative of an alternate and preferred embodiment of the invention wherein the feed belt is positioned in an horizontal plane with the entire center cut mechanism being tilted at about 60° to the horizontal, this adaptation being advantageous in the sense that such tilt eliminates the necessity of the bias device illustrated in, e.g., FIGURES 8 to 10, inclusive, for the product, as here shown, drops by gravity into position over the first of the center cut stages.

In the second and preferred embodiment of the invention, and more particularly exhibited in FIGURES 11 and 12, the feed table is disposed horizontally, with the entire two stage center cut apparatus being positioned at an appropriate angle. This construction eliminates the necessity of a return device or a biased feed plunger to successively force the product underneath the first pusher element. Also, end slabbing is accomplished upon the conveyor pick table by a paddle wheel feed arrangement forcing the product through two end cutters just prior to entry of the product into the two stage center cut assemblies, thus eliminating the need for any end cutters (as such are shown in FIGURES 6 and 7) at the latter phase of the process.

Figure 4:
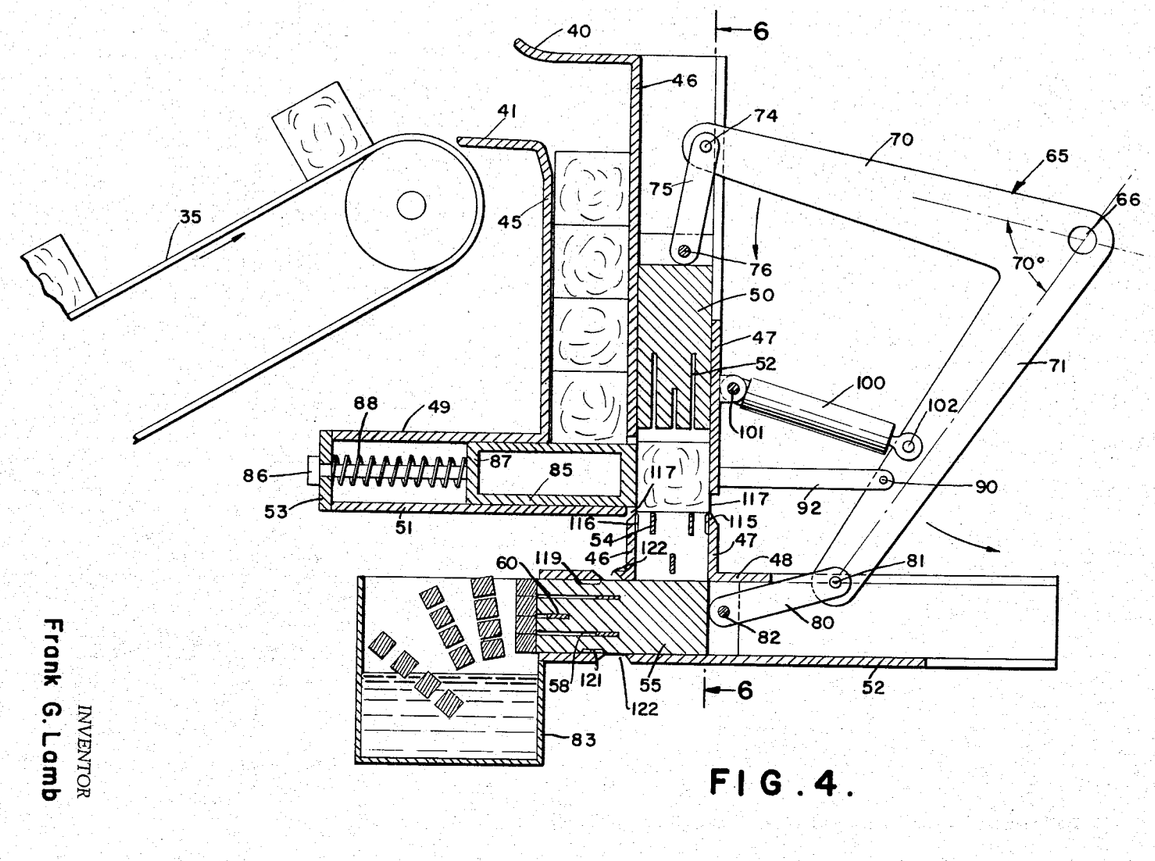
FIGURE 4 is a side elevation view, partially in section, illustrating particularly the center cut apparatus when vertically disposed, i.e., where the feed belt is located angularly to the horizontal; in this embodiment a biased feed means is utilized for charging of the product with reference to the first cut. This figure also illustrates the single and angled rocker arm (in raised position) comprising the basic propulsion element for this phase of the system.
Figure 5:
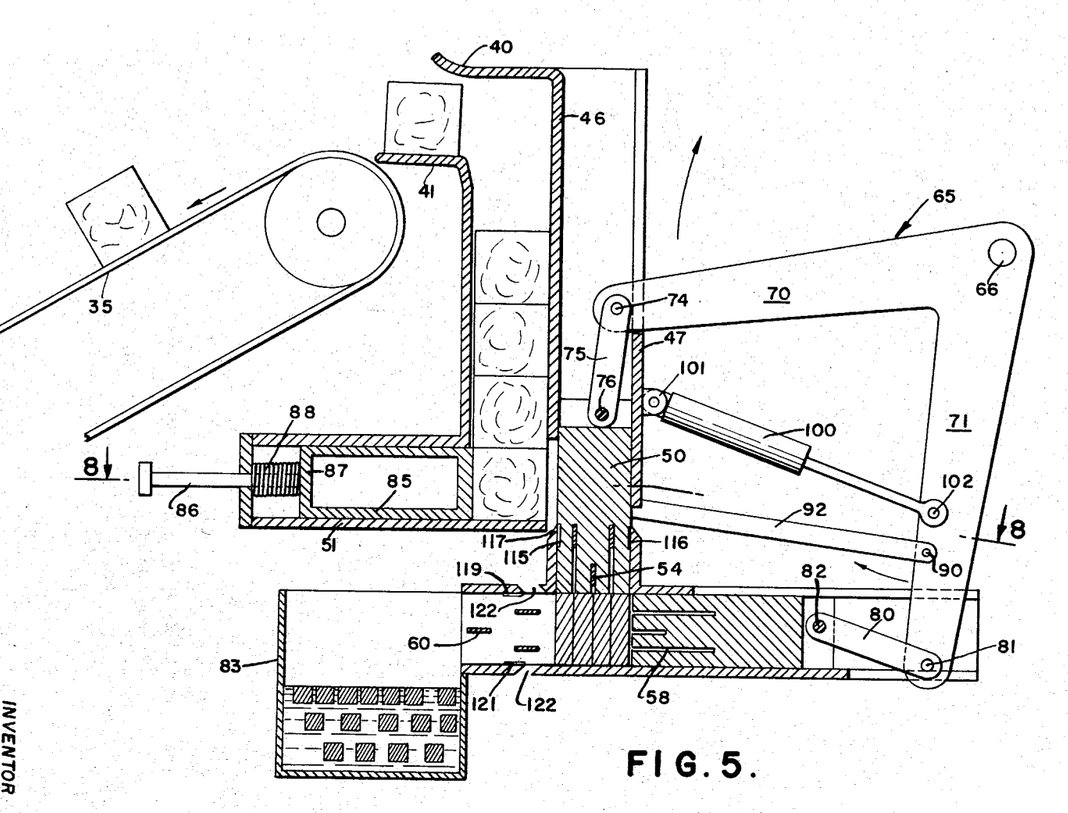
FIGURE 5 is similar to FIGURE 4, but depicts the rocker arm in lowered position with one cut (vertical) having been made and the product in position for the second cut; in this position of the arm the spring bias feed means has been automatically retracted.

The first of these embodiments of the invention is represented in FIGURE 4, this cross section illustration depicting the travel of the slabbed product upwardly on an inclined conveyor belt 35, for discharge (end wise) into a feed chute or trough comprising opposed members 40 and 41 which are formed integrally with vertical walls 45 and 46 between which such side slabbed products are deposited. The wall 46 in conjunction with the wall 47 and side walls 46a and 46b (FIGURE 8) forms a plunger or piston housing for the vertically reciprocating pusher member 50.

Top and bottom walls 48 and 52 in conjunction with the side walls 48a and 52a (FIGURE 6) also form an additional housing for the horizontally reciprocating pusher member 55, piston 50 comprising the means to make the first cut and pusher element 55 effectuating the second cut.

Both of these reciprocating pistons are motivated by the oscillatory motion of a pivoted, angular plate 65 positioned on pivot 66 and having two arms 70 and 71 angled to each other. These arms are angled with respect to the center axis of the pivot 66 in an amount (as indicated) of about 70°. The upper arm 70, through an additional pivot 74, is affixed to a link 75 having an upper apertured yoke 77 (FIGURES 6 and 7) for this purpose; and the lower end of the link 75, pivoted as at 76, and in an off center position to the vertically disposed pusher element 50. The latter is, of course, slotted as at 52, to receive the corrugated blades 54 in the lower end of this housing.

Similarly, the arm 71 of the pivoted drive element 65 is connected to a link 80 by way of pivot 81; the latter, in turn, by pivot 82 affixed in an off center position, to the lower, horizontally reciprocating pivot element 55. Here again the latter is slotted, as at 58, to accommodate the several blades 60 which achieve the final segmentation of the product. As indicated in FIGURE 4, the crinkle cut frenched product is fed from this last cut into a discharge trough 83 for the above mentioned purposes.

Gravity carries the product downwardly in the feed chute formed by walls 45 and 46 as shown in FIGURE 4; however, because of the vertical disposition of this assembly some means must be utilized for positive horizontal travel of the slabbed product from its position in the feed chute to the position in the piston housing between pusher element 52 and blades 54 and as shown in this figure. This means here takes the form of an additional housing formed of the top and bottom elements 49 and 51 and corresponding side elements (46a, 46b, FIGURE 8) each terminating in a back plate 53 which is apertured to receive a centrally disposed pin 86, the latter being adapted to receive the box member 85 which is slidably mounted in the referred to housing and adapted to reciprocate, in its appropriate chamber, upon the pin 86, the end wall 87 of the slidable member 85 being suitably apertured for this purpose. Intermediate such end wall 53 of this housing and sliding member 85 a helical spring 88 is positioned so as to exert constant thrust or bias upon the piston or thrust member 85. In the position shown in FIGURE 4, this thrust device 85 has been forced by spring 88 against the lowermost of the products in the receiving chute to push the latter to the cutting position indicated, i.e., just over the series of cutter blades 54 and just below the vertical pusher means or piston 50.

Figure 8:
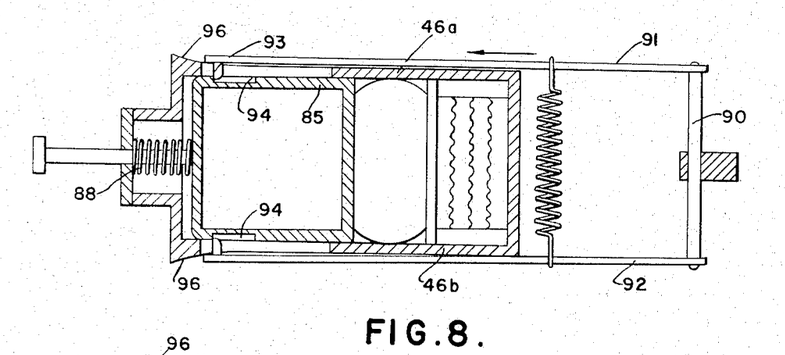
FIGURE 8 is a section view taken on the line 8—8 of FIGURE 5, showing the spring biased slide in retracted position with a side-slabbed potato having been dropped into position just prior to the cutting operation.
Figure 9:
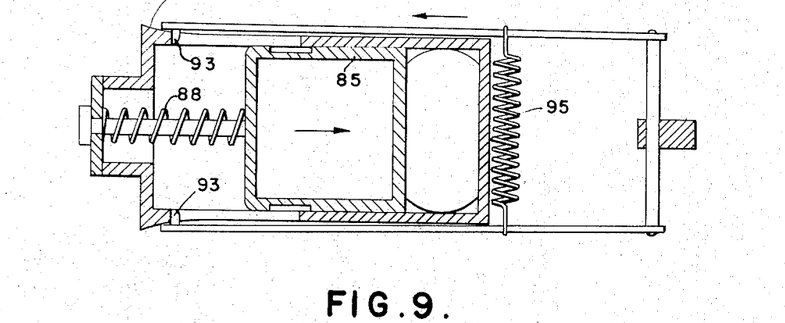
FIGURE 9 is a section view also taken on the line 8—8 of FIGURE 5, but merely illustrating the referred to slide or biased element in its released position, here having pushed the slabbed potato product over the crinkle cut grid in preparation for that cutting stage.
Figure 10:
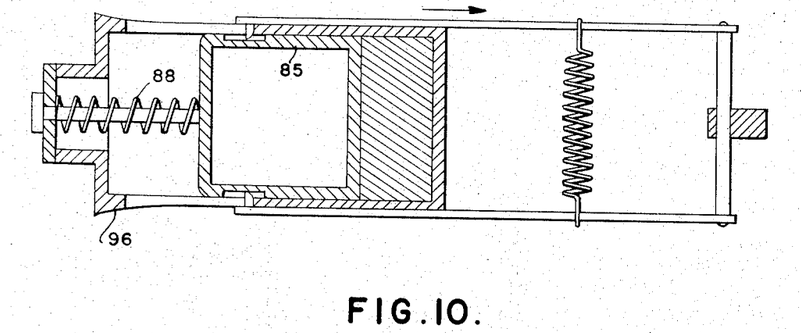
FIGURE 10 is a view similar to FIGURES 8 and 9 but with the referred to slide positioned adjacent to the vertical plunger which plunger has now begun its descent to force the product through the first series of crinkle cut knives.

The means for forcing this slidable feed device 85 rearwardly is found in the linkage depicted in FIGURES 8 to 10, inclusive. Such linkage consists of two bars 91 and 92, which are pivoted at one end to pivot 90, the latter being positioned in an appropriate bore through the lower arm 71 of the pivoted element 65. Each of these links or arms 91 and 92 terminate, at their opposite ends, in an inwardly extending button or cam 93, in each instance such cams being permitted to reciprocate somewhat in the slots 94 formed in the opposed side walls of the said chute, elongated slots being necessitated by the type of motion which is imparted to the links 91 and 92 upon movement of the triangular element 65.

These arms 91, 92 thus force the sliding feed device 85 to a rearward position as indicated in FIGURE 8, by appropriate movement of the drive member 65, with a consequent compression of the bias spring 88, the feed device 85 being illustrated in FIGURE 8 in its most rearward position. Upon further rearward travel in a very slight amount the cams 93 impinge upon two cam surfaces 96, representing outwardly curving portions and formed on each side of the housing for the reciprocating plunger 85, and as shown in FIGURES 8 to 10. The result of such further movement in the direction indicated in FIGURE 8 is to cause each of the drive elements 91 and 92 to be spread apart or diverged due to the riding of the ends of each of these elements upon the curved cam surfaces 96.

When the elements 91, 92 reach the approximate position shown in FIGURE 9 this outward deviation of elements 91, 92 causes the pins 93 to be forced out of the respective slots 94 in the feed member 85 thus releasing the latter for travel in a reverse direction because of the thrust exerted by spring 88. This movement is illustrated in FIGURE 9 where the feed pusher has exerted such thrust against the lowermost potato in the feed chamber, thus causing this slabbed product to move to the right (as seen in FIGURE 4) and to locate it in the position shown in this figure—above the segmenting blades and below the piston element 50.

In the meantime the lower piston 55 has moved to the left to complete the segmenting operation with the result that at this point the respective and related elements of this combination just described are positioned as shown in FIGURE 10, the pins 93 having been returned to slots 94 for repetition of the operation just described.

Since there must be a constant force which tends to maintain the elements 91 and 92 in the position shown in FIGURE 8 so that the pins 90 will tend to ride in the slots 94, during carriage of the slidable member 85 rearwardly, a simple spring means 95 is connected across such links 91 and 93, thus maintaining them in the relationship depicted in FIGURE 8 until forced outwardly, as described, by the cam surfaces 96 upon near completion of the rearward movement.

This entire linkage element which effectuates motion of both pusher elements, and the feed device 85, is operated by the simple expedient of a pneumatic reversible piston 100 pivoted to the housing of the vertical pusher as at 101 on the one hand, and to the lower arm 71 as at 102, on the other. Whether hydraulic or pneumatic, with pneumatic being preferred as being quicker acting, such piston 100 is of a type that can be extended and retracted at a relatively rapid rate of speed. Controls for such an element are well known to the art and need not be described here, it being observed that it will be accomplished by means adapted to fix its speed of operation within predetermined and desired limits, and easily variable, so that production output is well within the control of the operator.

It has been noted that in this embodiment of the invention slabbing is accomplished within the cutter assembly itself in contrast to the second embodiment thereof, to be described. To this end, the vertical pusher element 50 is provided on each side with reduced end portions or rabbets, as indicated at 120, (FIGURES 6 and 7) thereby to receive the elongated side slabbed potato, i.e., to receive the rounded end portions thereof which have not, as yet, been removed.

The two side sides of the housing having the lower reciprocating piston 55 are shown at 48a and 52a. These terminate in the upwardly extending slab cutting blades 108 and 110, beveled on their outside edges, as indicated, the overall interior width between sides 48a and 52a being, of course, of a dimension to readily receive that lower portion of the vertical piston which is of reduced width, as indicated in these figures, and as heretofore described.

Thus in the version of the invention just described it will be appreciated that the end slabbing operation is performed by the blades 108-110 during the same cut or reciprocal movement of the plunger 50 which effectuates the first crinkle center cut operation. In the alternate and preferred embodiment of the invention, which will be described later, end slabbing is accomplished in a different manner.

In any event, and with respect to both embodiments of the invention, it is preferred that the exterior surface of each of the completely slabbed segments be grooved or "crinkled" in order that the entire final product, including the outer strips removed from the slab, exhibit the typical corrugated exterior. To this end scoring knives are provided in the form of the cutting edges 115 and 116 on the two elements forming the casing, i.e., 46 and 47. Spaces or discharge openings, such as indicated at 117, are provided anterior to these cutting edges so that the scrap removed thereby can be disposed of. In other words, the blades 115 and 116 represent crinkle cut knives which more or less "score" the outer sides of the squared up potato after it has been slabbed by the water gun knife blades.

The remaining two of the four sides of the slabbed product encounter additional scoring blades 119 and 121 formed in the side walls 48 and 52 and accomplish scoring in the horizontal direction in the same manner. These blades are also immediately adjacent to the openings or spaces 122, permitting exit of such scrap material as is removed by the scoring operation.

Hence, by this vertical scoring and the subsequent horizontal scoring of the external surfaces of the "squared up block" each of the exterior side cuts are provided with a crinkle cut configuration.

The preferred embodiment of the invention will now be described, and particularly with reference to FIGURES 11 and 12 wherein like numerals designate like parts insofar as they are applicable.

Referring particularly to FIGURE 11, it is seen that the belt 35 is here horizontally disposed, and here shown as traveling over a supporting element 130. The crinkle cut assembly, however, is positioned at an angle to the horizontal, here illustrated as an angle of approximately 60°, thus enabling the squared up or slabbed product to slidably enter, by gravity, into the first cutting chamber positioned below the first cutter element 50. The entire cutting arrangement is supported in the angled position illustrated in FIGURE 11 by any usual and known means, not shown here.

Upon discharge from the conveyor belt 35 the blocked product is caused to travel a circulatory path matching the contour of conveyor supporting sheave 131 by several curvilinear guide elements 135 shaped upon the same radius as the sheave 131. These members 135 are fixed in any suitable manner to the side wall 46 as shown in FIGURE 11, the latter wall together with exterior wall 45 comprising a slanted chute down which the product travels until encountering the end wall 136. Because of the slant of the chute or passageway just described, the tendency of each slabbed product is to enter the chamber formed by walls 46 and 47, by gravity, and this occurrence is depicted in FIGURE 11 where one block so travels to be positioned immediately over the first series of cutters and, of course, immediately beneath the plunger 50. Upon the latter's descent one cut is made and the next slabbed product resting upon the base 136 is prevented from entering the first cutting chute because of the descent of the plunger downwardly. Upon retraction of the latter, however, the succeeding block is permitted to drop into place, this operation occurring successively and with great rapidity.

The second cut is made by means of the plunger 55 in the same manner as with respect to the first version of the invention hereinbefore described. Here again, also, scoring is obtained by the respective knives 115-116 in the first segmenting operation, and the knives 121-122 in the second cutting phase.

A further advantage flowing from the tilted arrangement of this embodiment is that the segments cut by knives 54 tend to fall or lean against pins 123 projecting downwardly from wall 48, the plunger 55 being slotted to accept the pins upon the forward stroke of the plunger. Thus, there is less likelihood that such segments will fall or lean toward the knives 60 as may occasionally occur in the previously described embodiment unless means are provided to retain the segments from such action.

In addition to this different positioning of the cutter assembly (as depicted in FIGURE 11), this preferred embodiment of the invention utilizes a separate and slabbing mechanism (and particular reference is here made to FIGURE 12). Here forward extending members 140 and 141 are supported upon the curved elements 135 in any suitable fashion. These terminate at their forward ends in two cutting knives 142 and 144, here shown as having removed the end slab S from a squared product that has just been forced therethrough. Such slabs are cast to one side as by the guide elements 150-151 where they may be collected (beneath the conveyor) by another conveyor or other suitable means for discard or additional processing.

Each of the slabbed products is aligned as indicated in FIGURE 12 and as hereinbefore referred to—at right angles or lengthwise to the line of travel of the conveyor. In this fashion they are guided by a chute formation formed of the divergent members 152 and 155 which respectively converge to two parallel elements 156 and 158, the latter being so spaced as to approximate the overall length of the slabbed product.

Since the invention is designed to make sure that the product is properly fed into the described cutters 142 and 144 irrespective of some variation in the overall length thereof, each of the side elements 156 and 158 are spring biased toward the center line. Thus the element or guide 156 is spring biased by springs 160, such element being supported upon suitable pins 162 which are affixed to each guide. If desired, the pins 162 can be threaded to receive nuts 165 by which the amount of spring tension may be varied. Similarly, guide member 158 is also biased toward the center line by helical springs 166, also mounted around pin elements 167, each of the latter likewise being adjustable, with respect to a predetermined amount of tension, by nut elements 168.

Thus, as the series of slabbed products progress toward this guide assembly, longer than desired segments are centered by the members 152–156 and 155–158 which are consistently urged toward the center line and biased to the same extent on each side.

Mechanism for forcing each product through the cutter knives as it emerges from the described guide means is found in a paddle wheel element generally indicated at 170 and consisting of four equally spaced (90° to one another) blades 171. This drive member is rotated in any suitable fashion upon a shaft 175. The latter is mounted in appropriate bearings 176.

Other details of the support for the drive member 170 are not here necessary, it being observed that those skilled in the art will necessarily recognize the fundamental objective of the mechanism here described. Important, however, is the timing of the speed of rotation of the rotating element 170. Here too, this can be accomplished by well known media, the speed of such being regulated to match the corresponding rate of feed from the water gun knife. In other words, the drive member 170, as indicated, is subject to variation in speed of operation so that it can be precisely timed with the speed of output of the water gun knife and, of course, the corresponding rate of speed of the crinkle cut mechanism.

Figure 13:
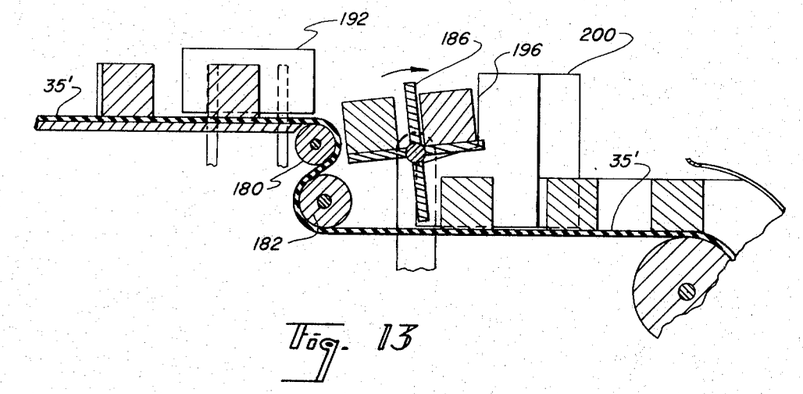
FIGURE 13 is a fragmentary side elevation of another arrangement for removing end slabs from the product prior to feeding the same to the tilted cutter mechanism.
Figure 14:
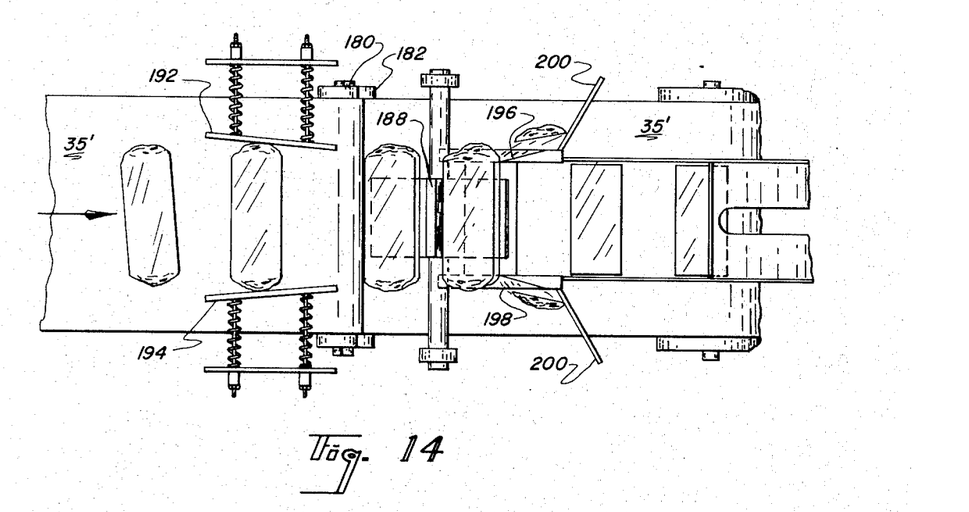
FIGURE 14 is a top plan view of the apparatus shown in FIGURE 13.

Still another arrangement for trimming the slabbed product to maximum desired length is shown in FIGURES 13 and 14. As most clearly shown in FIGURE 13 in this arrangement the conveyor 35' is stepped down a short distance before its discharge end by passing the conveyor over a pulley 180 and beneath a lower pulley 182. Mounted just forwardly of the pulley 180 is a paddle wheel 186 driven by suitable means (not shown) in a clockwise direction. The paddle wheel is spaced from the pulley 180 such that the slabbed potatoes fall over the pulley and onto the paddles 188 which are just slightly longer than the width of the slabbed product so that only one product will be caught upon each paddle. The paddles are of a width just slightly less than the maximum desired length of the squared product to be fed into the cutter assembly and rotate between two parallel knives 196, 198 spaced apart in the mentioned maximum desired length. A pair of converging spring biased guides 192, 194 are provided on the upper flight of the conveyor 35' to center over length product with respect to the knives 196, 198 through which the product is forced as the paddle wheel 186 rotates. Suitable means such as guides 200 are provided to shunt the severed ends to one side for suitable disposal. The end trimmed product is then delivered onto the lower flight of the conveyor 35' as the paddle wheel 186 continues to rotate. The paddle wheel 186 in this instance serves to align the product upon the conveyor 35' so that the long axis of the product is normal to the direction of travel. The alignment occurs since as a product is carried upwardly by a paddle 188 and slides to the hub thereof, it will automatically be aligned with the axis of the hub and such alignment will be maintained when it is redelivered to the conveyor 35'.

Further with regard to the coordination of the several slabbing and cutting operations it may be desirable to provide a means to stop operation of the crinkle cut mechanism when the feed of the slabbed product, for some reason, lags. To this end a sensing mechanism in the form of a microswitch 200 (see FIGURE 11) or some similar means, is positioned in the side 45 of the feed chute. With the chute filed with several slabbed products such a switch would be in its "on" position, thus calling for continued operation of the crinkle cut mechanism. However, when the feed lags to the extent that no product bears against the sensing device 200 such then inactivates the pneumatic means 100 until such time as the slabbed products again fill the feed chute, causing pressure upon the sensing device 200 to reactivate the pneumatic propulsion system for the segmenting operation.

From the foregoing description of the invention the sequence of the operation should be apparent. The potatoes are fed by means of hydraulic pressure through the product accelerator and thence to the side slab cutter where four sides of the potato are removed. Separated from the slabs, the slabbed products are fed to a feed belt in such manner that they lie crosswise to the direction of feed. In one version of the invention the slabbed products are fed directly to the two phase crinkle cut system and here the end slabs removed. In the other and preferred embodiment of the invention the end slabs are removed by slab cutters positioned over the conveyor belt with the products being centered for direct impingement upon the end slabber and being forced into the same by a suitable, timed drive mechanism. In the preferred version of the invention the feed belt is horizontally disposed with the cutter mechanism angled thereto; in both alternates of the invention the products are provided with a corrugated cut on each of the edges, the outer segments being appropriately scored during the segmenting operation for this purpose. As indicated, the design of the invention contemplates extremely high speeds of operation and eliminates as much as possible any manual intervention.

With regard to the relative positioning of the various elements of the combination as referred to in the several drawings thereof, it should be understood that the parts are proportioned, relative to each other, in approximately those proportions indicated in these figures. In other words and, e.g., viewing FIGURES 4 and 11, the two arms 70 and 71 of the rocker arm 65 are angled to each other in an amount of about 70°; the link elements 75 and 80, the biased spring drive elements 91 and 92, the pusher elements or pistons 50 and 55 are of a proportionate or ratio size generally conforming to that shown. Thus, and well within the skill of the art, these various linkages and the parts of the combination driven thereby are correlated to obtain smooth workability of the entire assembly.

As indicated, the preferred version of the invention is found in the above description made with respect to FIGURES 11 and 12, this version exhibiting additional advantages: elimination of the bias feed means for feeding each block into the first cutter element; and also, horizontal disposition of the feed belt facilitating use of the same as a "pick table" for the rearrangement and necessary preliminary centering of the product as it is rapidly fed thereto from the product belt indicated in FIGURE 1.

It is, of course, obvious that other alternates and variables may be incorporated without departing from the spirit and scope of this invention, it being understood that the scope thereof is to be limited only by such limitations as are set forth in the claims appended hereto.

I claim:

1. In an apparatus for cutting vegetable products into predetermined shapes, the combination comprising: a product cutter having cutting means to remove four exterior slabs, a hydraulic food pump to feed said products to said cutter whereby to produce elongated slabbed segments, crinkle cut cutting means comprising a first and second set of corrugated blades, said first set being disposed to make a first cut across the length of said products and said second set being disposed to make a second cut right angularly to said first cut, a horizontal conveyor means, said conveyor means being adapted to receive said segments and feed said segments lengthwise into said crinkle cut cutting means, said last named means having a feed chute disposed angularly to said conveyor means, whereby said segments are fed by gravity into said crinkle cut cutting means.

2. The invention as defined in claim 1 wherein an inclined conveyor means is adapted to receive said segments, said crinkle cut cutting means is vertically disposed, and positive drive means are disposed to sequentially feed said segments into said first set of corrugated blades.

3. The invention as defined in claim 1 wherein means are provided anterior to said crinkle cut cutting means to remove the ends of said slabbed segments.

4. The invention as defined in claim 1 wherein additional cutting means are provided adjacent to said first set of said corrugated blades to remove the ends of said slabbed segments.

5. A method for the cutting of a vegetable food product into frenched segments having corrugated sides, comprising charging said product while being carried in a fluid medium to a first cutting zone to remove the four longitudinal exterior sides therefrom thereby to produce a four sided, elongated slabbed segment, then conveying said segments by gravity sideways through a first crinkle cut zone, then through a second crinkle cut zone disposed right angularly to said first zone, whereby said product is divided into a plurality of crinkle cut, frenched segments.

6. The method as defined in claim 5 wherein said segments are sequentially and positively driven into said first crinkle cut zone.

References Cited

UNITED STATES PATENTS

| | | | |
|---|---|---|---|
| 2,801,661 | 8/1957 | Miller | 146—169 X |
| 2,291,449 | 7/1942 | Burgess et al. | 146—169 |
| 3,116,772 | 1/1964 | Lamb et al. | 146—169 X |
| 3,273,617 | 9/1966 | Lamb | 146—169 X |

W. GRAYDON ABERCROMBIE, *Primary Examiner.*